H. ZERNING.
PROCESS OF OBTAINING GASOLENE SUBSTITUTE.
APPLICATION FILED JAN. 20, 1913.
Patented May 16, 1916.
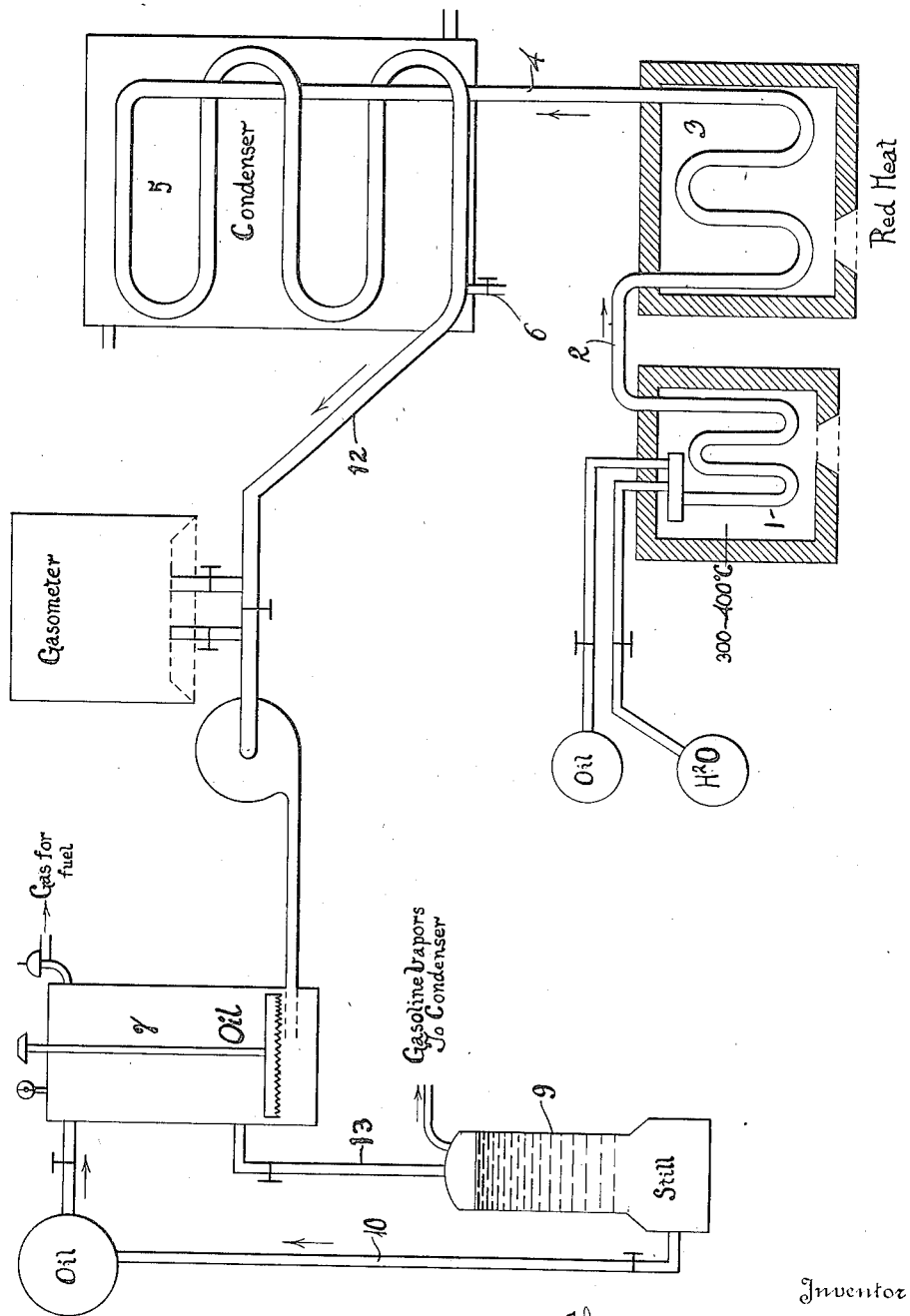

UNITED STATES PATENT OFFICE.

HERMANN ZERNING, OF HALENSEE, GERMANY.

PROCESS OF OBTAINING GASOLENE SUBSTITUTE.

1,183,266.    Specification of Letters Patent.    Patented May 16, 1916.

Application filed January 20, 1913. Serial No. 743,147.

*To all whom it may concern:*

Be it known that I, HERMANN ZERNING, a subject of the German Emperor, and resident of Halensee, Germany, have invented certain new and useful Improvements in Processes of Obtaining Gasolene Substitute, of which the following is the specification.

The present invention relates to a process of converting mineral oils, and other hydrocarbons, into a more readily vaporizable or more volatile material, in order to produce a gasolene substitute therefrom, which gasolene substitute will be capable of use directly in internal combustion engines.

In the following description I use the term "hydrocarbon" to designate mineral oils, petroleum, shale oil, schist oil, as well as distillates thereof, and the like.

My improved process comprises the step of absorbing certain vapors or gases resulting from the decomposition (cracking) of hydrocarbons, of the kinds above stated, in oils of higher boiling points. Such absorption may be effected under more or less pressure, and is preferably continued until the hydrocarbons are fully saturated with the stated gases or vapors. The product of this process has a flashing point lower than that of the original oil.

Gases suitable for use in treating ordinary petroleum, and which will be readily absorbed thereby, may be obtained by decomposing petroleum or other heavy hydrocarbons, preferably in the presence of a suitable catalytic body, for instance water, which is the cheapest of all suitable catalytic materials. This treatment will be carried out at a comparatively high temperature, for example a mixture of water and the hydrocarbon, preferably in the proportion of 1 part of water for every 6 to 10 parts of the oil, is forced under sufficient pressure, into or through a still heated to a temperature of 300 to 400° C. The vapors thus evolved are conveyed through pipes heated to a dark red, then through cooling coils, in which the separation of water, heavy oil, and tarry matters from the uncondensed gases is effected, which gases are then directly introduced into the hydrocarbon oils under treatment, or preferably are collected in a gas holder, for being so employed later on. The pipes in which the second heating step is carried out, are preferably steel pipes protected from overheating by a layer of fire-clay, or other suitable material. The treatment of the petroleum or the like with the stated gases is preferably carried on under considerable pressure, in order to accelerate the absorption of the gases. Thereafter the material may be subjected to partial distillation and that fraction which passes over at or below the usual distilling temperature of ordinary gasolene, forms the gasolene substitute in accordance with the present process, and the liquid remaining in the still may be again subjected to the action of the described gases, after cooling, or may be subjected to the cracking operation.

In the accompanying drawing I have shown diagrammatically an apparatus for carrying out the process of the present invention, although obviously the invention is not limited to the use of such particular apparatus.

As a specific example of carrying out my process, the following is given. A suitable vessel (being preferably in the form of a steel pipe 1 surrounded with fire clay or the like, to prevent over-heating of the oil) is heated, and a mixture of petroleum and water in the proportion of 8 parts of petroleum to 1 part of water (more or less) is passed through said pipe, at a rate of speed, such that the mixture of petroleum and water leaves the coil of pipe (of which there may be one or several) at a temperature of about 300° C. to 400° C. The resulting steam and vapors are conveyed through pipe 2 to a superheating arrangement composed of pipes 3, heated to incandescence, or preferably to a dull redness, say 700° C., the rate of passage of the vapors depending upon the temperature of the pipes, and also more or less upon the character of the petroleum employed, and upon the proportions of petroleum and water. Care must be taken not to pass the gases too slowly, since this would produce too complete a decomposition, which would lead to the formation of considerable quantities of free carbon, and consequently would produce an unsatisfactory result, both as to the yield and the character of the gases and vapors. The gases and vapors are then carried through pipe 4 and a condenser 5 in which the water, heavy oil and tarry substances are condensed and the condensate drawn off through pipe 6 from the uncondensed gases, which gases are preferably conveyed through pipe 12 into a gasometer or storage receptacle. From said storage receptacle, (or, less advantageously, from the condenser directly) the gases are conveyed into and through one or several receptacles 7 containing hydrocarbon oil, such as petroleum, under pressure and at ordinary temperature. The minimum strength of such receptacles will depend upon the amount of pressure to be employed therein, and in case the gases are conveyed, directly from the condenser into and through these receptacles, the pressure employed should not be too high, since this would cause too slow a passage of the gases through the superheating coil, and accordingly produce too much decomposition therein. After passing through the petroleum or other oil in the one or several receptacles 7, the unabsorbed gases may be used as fuel.

The material in the receptacles is very different from the starting material, such as petroleum or other oil previously placed therein, and under some circumstances may be used directly as a substitute for gasolene. The specific gravity of said material is lower than that of the starting material, it has also considerably increased in volume, and the flash point is very much lower. For instance in a particular experiment the gases from the cracking of petroleum as above described were directly introduced under a pressure of about 1 atmosphere (above normal) into crude petroleum of which the specific gravity was .794, its flash point being that of ordinary petroleum. The resulting material was a hydrocarbon spirit having a specific gravity of .775, and a flash point of about 10° C. With higher pressure in the absorption receptacles, these figures were more satisfactory. This material is preferably led through pipe 13, into the still 9, where it is then subjected to fractional distillation and the portion which volatilizes at a comparatively low temperature may be separately condensed, forming a gasolene substitute, which is very suitable for use in internal combustion engines or the like. The portion which is less volatile than this gasolene fraction being pumped up through pipe 10, to the oil reservoir, and after cooling may be again subjected to treatment with a further quantity of the above described gases. The exact temperature at which the collection of the gasolene substitute will preferably be stopped can not be generally stated, for the reason that this depends upon a number of conditions, such as the particular grade of mineral oil employed, the temperature and pressure used in the absorption step, and the temperature used in the cracking of the mixture of oil and water.

What I claim is:—

1. A process of making a gasolene substitute which comprises cracking hydrocarbon oils by heating the same in the presence of a catalytic agent, to a temperature of 300 to 400° C., then passing the vapors thereby produced through a conduit heated to dark redness, and then cooling the gases and vapors sufficiently to separate water, and materials of high boiling points therefrom, then passing the remaining gases into contact with a heavy hydrocarbon oil under pressure, until said oil becomes substantially saturated.

2. A process of making a gasolene substitute which comprises cracking hydrocarbon oils by heating the same in the presence of a catalytic agent, to a temperature of 300 to 400° C., then passing the vapors thereby produced through a conduit heated to dark redness, and cooling the gases and vapors sufficiently to separate water and materials of high boiling points, then passing the remaining gases into contact with a heavy hydrocarbon oil under pressure, until said oil becomes substantially saturated and finally distilling off a fraction corresponding to the boiling point range of ordinary gasolene.

3. A process of converting mineral oils and other hydrocarbons into substances having lower boiling points, said process comprising the steps of introducing oil and water into a retort heated to a temperature of about 300° C., allowing the resulting gases and vapors to freely escape from said retort, conveying said gases and vapors into a second retort, in which they are heated to a higher temperature, cooling said gases and vapors sufficiently to remove water and materials having high boiling points, and thereafter passing the cooled gases into contact with a relatively heavy hydrocarbon oil under pressure, until said oil becomes substantially saturated.

In testimony whereof I have hereunto set my hand in presence of two witnesses.

HERMANN ZERNING.

Witnesses:
 ALBERT HOFMANN,
 Dr. PAUL HOLLEFREUND.